United States Patent
Lindoff et al.

(10) Patent No.: US 12,476,664 B2
(45) Date of Patent: Nov. 18, 2025

(54) MULTI-ANTENNA TRANSCEIVER SYSTEM FOR MULTI-BAND OPERATION

(71) Applicant: BEAMMWAVE AB, Lund (SE)

(72) Inventors: Bengt Lindoff, Bjärred (SE); Per-Olof Brandt, Lomma (SE); Jonas Lindstrand, Lund (SE)

(73) Assignee: BEAMMWAVE AB, Lund (SE)

( * ) Notice: Subject to any disclaimer, the term of this patent is extended or adjusted under 35 U.S.C. 154(b) by 351 days.

(21) Appl. No.: 18/248,136

(22) PCT Filed: Oct. 7, 2021

(86) PCT No.: PCT/EP2021/077645
§ 371 (c)(1),
(2) Date: Apr. 6, 2023

(87) PCT Pub. No.: WO2022/074096
PCT Pub. Date: Apr. 14, 2022

(65) Prior Publication Data
US 2023/0387958 A1    Nov. 30, 2023

(30) Foreign Application Priority Data
Oct. 9, 2020  (EP) ..................................... 20200971

(51) Int. Cl.
*H04B 1/403*    (2015.01)
*H04B 1/00*    (2006.01)

(52) U.S. Cl.
CPC ........... *H04B 1/403* (2013.01); *H04B 1/0096* (2013.01)

(58) Field of Classification Search
CPC .............. H04B 1/403; H04B 1/0096
(Continued)

(56) References Cited

U.S. PATENT DOCUMENTS

| | | | |
|---|---|---|---|
| 5,432,521 A | 7/1995 | Siwiak et al. | |
| 6,052,419 A | 4/2000 | Hioki | |

(Continued)

FOREIGN PATENT DOCUMENTS

EP    0833448 A2    4/1998

OTHER PUBLICATIONS

European Search Report for Application No. 20200971.8, dated Feb. 18, 2021.

(Continued)

*Primary Examiner* — Dominic D Saltarelli
(74) *Attorney, Agent, or Firm* — MARSHALL, GERSTEIN & BORUN LLP

(57) ABSTRACT

A multi-antenna transceiver system is disclosed. The system comprises a group of transceiver chips, wherein each transceiver chip has a respective chip-associated (e.g., on-chip) frequency generator configured to provide a respective conversion frequency, and wherein each transceiver chip is configured to use the respective conversion frequency for on-chip frequency conversion of a transceiver signal. The system also comprises a controller adapted to cause configuration of the respective chip-associated frequency generator of at least one of the transceiver chips, wherein the configuration comprises dynamically setting the respective conversion frequency. In some embodiments, the controller comprises a single piece of circuitry separate from the transceiver chips. The single piece of circuitry is adapted to cause configuration of the respective chip-associated frequency generator of two or more of the transceiver chips.

12 Claims, 5 Drawing Sheets

(58) Field of Classification Search
USPC .......................................................... 375/219
See application file for complete search history.

(56) References Cited

U.S. PATENT DOCUMENTS

| | | |
|---|---|---|
| 6,944,121 B1 | 9/2005 | Weste et al. |
| 2014/0185718 A1 | 7/2014 | Ruelke et al. |
| 2015/0049792 A1* | 2/2015 | Han .................. H04L 25/03343 |
| | | 375/219 |
| 2016/0080017 A1 | 3/2016 | Wang et al. |
| 2017/0215192 A1 | 7/2017 | Lipowski et al. |
| 2022/0069851 A1* | 3/2022 | Huang .................... H04B 1/38 |

OTHER PUBLICATIONS

Ek Staffan et al: "A 28-nm FD-SOI 115-fs Jitter PLL-Based LO System for 24-30-GHz Sliding-IF 5G Transceivers", IEEE Journal of Solid-State Circuits, IEEE, USA, vol. 53, No. 7, Jul. 1, 2018 (Jul. 1, 2018), pp. 1988-2000, XP011685901, ISSN: 0018-9200, DOI: 10.1109/JSSC.2018.2820149 [retrieved on Jun. 26, 2018] abstract; figures 3,4 Sections II and III.
International Search Report and Written Opinion of the International Searchig Authority for Application No. PCT/EP2021/077645, dated Jan. 31, 2022.

* cited by examiner

MULTI-ANTENNA TRANSCEIVER SYSTEM FOR MULTI-BAND OPERATION

CROSS-REFERENCE TO RELATED APPLICATIONS

This present application is the US national phase of International Patent Application No. PCT/EP2021/077645, filed Oct. 7, 2021, which claims priority to European Application No. 20200971.8, filed Oct. 9, 2020. These applications are hereby incorporated by reference in their entireties.

TECHNICAL FIELD

The present disclosure relates generally to the field of multi-antenna transceiver systems. More particularly, it relates to multi-antenna transceiver systems suitable for operation in two or more frequency bands.

BACKGROUND

A multi-antenna transceiver may be constructed using a plurality of transceiver chips, wherein each transceiver chip is associated with one or more corresponding antenna elements. For multi-band operation, each transceiver chip is provided with two or more transceiver chains (one for each simultaneously used frequency band).

Such transceiver chips may experience on-chip interference and/or intermodulation distortion. Alternatively or additionally, such transceiver chips may have relatively high power consumption (e.g., due to losses in the front-end/antenna interface). Yet alternatively or additionally, such transceiver chips may have relatively large physical size (e.g., due to having several transceiver chains and/or due to complexity of the front-end/antenna-interface); especially when mitigation for on-chip interference and/or intermodulation distortion is considered.

Therefore, there is a need for alternative approaches to multi-band operation of multi-antenna transceiver systems.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a multi-antenna transceiver system comprising a group of transceiver chips and a controller.

Each transceiver chip has a respective chip-associated frequency generator configured to provide a respective conversion frequency, wherein each transceiver chip is configured to use the respective conversion frequency for on-chip frequency conversion of a transceiver signal.

The controller is adapted to cause configuration of the respective chip-associated frequency generator of at least one of the transceiver chips, wherein the configuration comprises dynamically setting the respective conversion frequency.

In some embodiments, the controller comprises at least one respective piece of circuitry comprised on at least one of the transceiver chips, wherein the respective piece of circuitry is adapted to cause configuration of the respective chip-associated frequency generator of at least the transceiver chip on which it is comprised.

In some embodiments, the controller comprises a single piece of circuitry separate from the transceiver chips, wherein the single piece of circuitry is adapted to cause configuration of the respective chip-associated frequency generator of two or more of the transceiver chips.

In some embodiments, the respective conversion frequencies are different for at least two of the transceiver chips.

In some embodiments, the controller is further adapted to acquire—for each of two or more conversion frequencies—a reception quality parameter value per transceiver chip, and dynamically setting the respective conversion frequencies is based on the reception quality parameter values.

In some embodiments, the controller is further adapted to cause configuration of a respective on-chip analog-to-digital converter (ADC) and/or a respective on-chip digital-to-analog converter (DAC) of at least one of the transceiver chips, wherein the configuration comprises dynamically setting a sampling rate of the on-chip ADC and/or DAC based on a bandwidth associated with the respective conversion frequency (e.g., the bandwidth for the received modulated carrier signal).

In some embodiments, the multi-antenna transceiver system further comprises baseband processing circuitry configured to process transceiver signals for the transceiver chips.

In some embodiments, the multi-antenna transceiver system further comprises a reference frequency generator configured to provide a reference frequency for each transceiver chip of the group, wherein each respective conversion frequency is higher than the reference frequency, and wherein the respective chip-associated frequency generator of each transceiver chip is configured to provide the respective conversion frequency based on the reference frequency and on the configuration caused by the controller.

A second aspect is a controller for a multi-antenna transceiver system that comprises a group of transceiver chips, wherein each transceiver chip has a respective chip-associated frequency generator configured to provide a respective conversion frequency, and wherein each transceiver chip is configured to use the respective conversion frequency for on-chip frequency conversion of a transceiver signal.

The controller comprises circuitry adapted to cause configuration of the respective chip-associated frequency generator of at least one of the transceiver chips, wherein the configuration comprises dynamically setting the respective conversion frequency.

A third aspect is a transceiver chip for a multi-antenna transceiver system. The transceiver chip comprises a chip-associated frequency generator configured to provide a conversion frequency based on a control signal indicative of a dynamic setting for the conversion frequency, and a frequency converter configured to use the conversion frequency for on-chip frequency conversion of a transceiver signal.

In some embodiments, the chip-associated frequency generator and the frequency converter comprises two or more sets (each comprising a chip-associated frequency generator and at least one frequency converter); one per conversion frequency range and/or one per polarization orientation.

A fourth aspect is a network node comprising the multi-antenna transceiver system of the first aspect and/or the controller of the second aspect.

A fifth aspect is a wireless communication device comprising the multi-antenna transceiver system of the first aspect and/or the controller of the second aspect.

A sixth aspect is a method of operating a multi-antenna transceiver system comprising a group of transceiver chips, wherein each transceiver chip has a respective chip-associated frequency generator configured to provide a respective conversion frequency, and wherein each transceiver chip is configured to use the respective conversion frequency for on-chip frequency conversion of a transceiver signal.

The method comprises configuring the respective chip-associated frequency generator of at least one of the transceiver chips, wherein the configuration comprises dynamically setting the respective conversion frequency.

A seventh aspect is a computer program product comprising a non-transitory computer readable medium, having thereon a computer program comprising program instructions. The computer program is loadable into a data processing unit and configured to cause execution of the method according to the sixth aspect when the computer program is run by the data processing unit.

In some embodiments, any of the above aspects may additionally have features identical with or corresponding to any of the various features as explained above for any of the other aspects.

An advantage of some embodiments is that alternative (e.g., improved) approaches to multi-band operation of multi-antenna transceiver systems are provided.

An advantage of some embodiments is that on-chip interference and/or intermodulation distortion caused by two or more transceiver chains being provided on each transceiver chip is reduced compared to prior art approaches. The control provided by various embodiments by dynamically setting the respective conversion frequency enables use of transceiver chips with single transceiver chain.

An advantage of some embodiments is that power consumption is reduced compared to prior art approaches. For example, a transceiver chip with a single transceiver chain may have lower power consumption than a transceiver chip with two or more transceiver chains. Hence, power consumption per transceiver chip can be reduced. Alternatively or additionally, the overall power consumption can be reduced (e.g., since unused transceiver chains can easily be put in a low power mode when each transceiver chip has a single transceiver chain; while—in the prior art—unused transceiver chains continue to consume power as long as one transceiver chain on the same transceiver chip is used).

An advantage of some embodiments is that the physical size of each transceiver chip is reduced compared to prior art approaches.

An advantage of some embodiments is increased flexibility and/or simplicity—compared to the prior art—when using transceiver chips to design a multi-antenna transceiver system; e.g., for multi-band operation.

An advantage of some embodiments is that losses in, and/or isolation requirements of, the front-end/antenna interface may be reduced.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1:
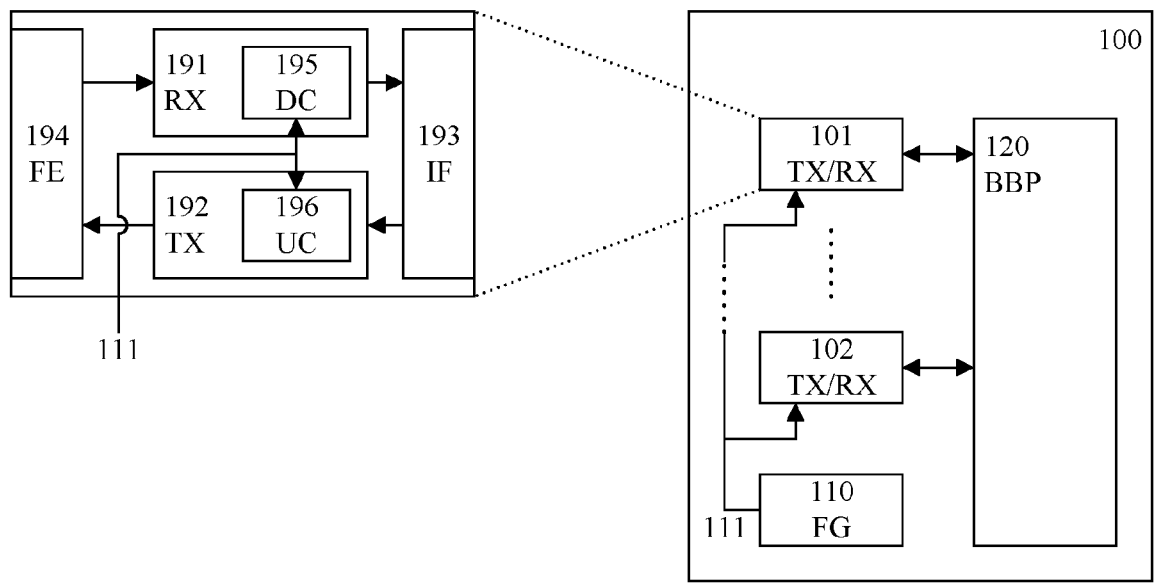
FIG. 1 is a schematic block diagram illustrating an example multi-antenna transceiver system with a single frequency generator.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, when provision/use/etc. of a frequency is referred to herein, it may be understood as including provision/use/etc. of a signal which is indicative of the frequency.

Also generally, when an antenna element is referred to herein, it may be a constituent antenna of a multi-antenna arrangement (e.g., an antenna array, and antenna matrix, an antenna panel, etc.), for example.

Also generally, although up-conversion and down-conversion is exemplified herein as being between radio frequency and baseband frequency, it should be understood that embodiments may be equally applicable for up-conversion and/or down-conversion via one or more intermediate frequencies.

Furthermore, when a functional unit of a transceiver chain is referred to herein (e.g., ADC, DAC, frequency converter, mixer, filter, etc.), it should be understood that such reference may include a pair of functional units for in-phase/quadrature processing.

Multi-antenna transceivers may be used for multiple-input multiple-output (MIMO; e.g., massive MIMO or traditional MIMO) communication and/or for beamformed communication (e.g., transmission pre-coding and/or reception combining). In such applications, the baseband content is typically the same for some (e.g., all) transceiver chips, while the transmitted/received signals typically differ between antenna elements. Thus, the baseband processing may typically comprise processing of a radio signal which is simultaneously received or transmitted by the different antenna elements, on the same carrier frequency.

In some embodiments, the multi-antenna transceiver systems presented herein, or part thereof, may be particularly suitable for massive MIMO and/or beamforming.

Generally, transceiver architectures for massive MIMO and/or beamforming may be implemented using analog multi-antenna control, digital multi-antenna control, or hybrid multi-antenna control.

With analog multi-antenna control, beamforming is typically performed at radio frequency (RF) using a bank of phase shifters (one per antenna element), an analog power combiner for the receiver, and a power splitter for the transmitter. This typically requires only one analog-to-digital converter (ADC) instance (typically a pair of ADCs for in-phase/quadrature conversion) and one digital-to-analog converter (DAC) instance (typically, a pair of DACs for in-phase/quadrature conversion) for the receiver and transmitter, respectively, which reduces the complexity compared to when more ADC/DAC instances are needed. The antenna elements may be clustered and implemented in the form of an antenna panel.

With digital multi-antenna control, beamforming is typically performed at baseband frequency (e.g., in a digital baseband processor). Typically, each transceiver chain requires an ADC instance (typically a pair of ADCs) and a DAC instance (typically a pair of DACs). A digital beamforming transceiver may be configured to simultaneously direct beams in, at least theoretically, an infinite number of directions. Thus, digital beamforming transceivers are superior at tracking radio signals (e.g., when mobile devices move fast relative to the radio base station).

As mentioned before, a (digital) multi-antenna transceiver may be constructed using a plurality of transceiver chips and a frequency generator providing a conversion frequency to each of the transceiver chips. For example, in digital beamforming architectures, each transceiver chain—including antenna elements—may be integrated in a single chip, and a set of such transceiver chips (two or more; e.g., 4-16, or more) may be used to implement the multi-antenna transceiver system.

FIG. 1 schematically illustrates an example multi-antenna transceiver system 100 with a plurality of transceiver chips (TX/RX) 101, 102 and a single frequency generator (FG) 110 providing the conversion frequency 111 to each of the transceiver chips. The example system 100 also comprises a baseband processor (BBP) 120 configured to process transceiver signals for the transceiver chips.

An example schematic architecture for a transceiver chip 101, 102 is illustrated in FIG. 1.

The example architecture comprises a receiver path (RX) 191 and a transmitter path (TX) 192. The receiver path comprises a down-converter (DC) 195 and the transmitter path comprises an up-converter (UC) 196. The down-converter and up-converter each receives the conversion frequency from the frequency generator for on-chip frequency conversion of a transceiver signal (i.e., down-conversion of a received signal in the receiver path and/or up-conversion in the transmitter path of a signal to be transmitted).

The receiver path 191 and the transmitter path 192 may generally comprise any suitable functional and/or physical components (e.g., as known in the art). The receiver path may, for example, comprise a low-noise amplifier (LNA), mixer circuitry (for down-conversion), one or more filters (e.g., a low-pass filter; LPF), and a variable gain amplifier. The transmitter may, for example, comprise one or more filters (e.g., a low-pass filter; LPF), mixer circuitry (for up-conversion), and a power amplifier (PA).

Furthermore, the example architecture for a transceiver chip comprises a front end (FE) 194 and an interface (IF) 193. The interface 193 is for connection to the baseband processor 120, and can have any suitable functional and/or physical components (e.g., as known in the art).

The front-end 194 may be for connection to one or more antenna elements or may comprise one or more on-chip antenna elements. Thus, each transceiver chip 101, 102 of the multi-antenna transceiver system 100 is associated with one or more corresponding antenna elements. Furthermore, the front-end 194 may comprise any suitable functional and/or physical components (e.g., as known in the art). For example, the front end 194 may comprise duplexer or diplexer circuitry (e.g., switching circuitry, filters, etc.) for separation of received signals from signals to be transmitted.

Thus, in typical digital beamforming solutions with the transceivers associated with different antenna elements provided on different RF chips (compare with transceiver chips 101, 102), a single Local Oscillator (LO; compare with the frequency generator 110) is used to generate the carrier (with frequency $f_c$; compare with 111) for down-conversion and/or up-conversion, and the generated carrier is distributed to all of the RF chips.

The RF signal for RF chip i, i=1, . . . , N, can be represented as $S_i(t)e^{j2\pi f_c t}$. The LO signal 111 can be represented as $e^{j(2\pi f_c t+\varphi)}$ and typically has an unknown phase $\varphi$ which will phase shift the baseband signal $S_i(t)$ to $S_i(t)e^{j\varphi}$ for RF chip i, i=1, . . . , N. However, the phase shift is typically the same for all RF chips, so a channel estimator operating in baseband frequency may consider the unknown phase shift as part of the overall channel to be estimated. Hence, coherent combining of received signals $S_i(t)$ can be achieved without particularly addressing the unknown phase shift.

As mentioned before, each transceiver chip must be provided with multiple transceiver chains (one for each simultaneously used frequency band) when multi-band operation is desired, e.g., for carrier aggregation and/or dual connectivity. This may be problematic because the transceiver system design becomes less flexible, and/or since such transceiver chips may become relatively large, have relatively high power consumption, have relatively high on-chip interference, and/or have relatively high intermodulation distortion.

As an example scenario of application of multi-band operation, beamforming transceivers are typically used in mobile devices for communication in fifth generation new radio (5G-NR); especially when communication takes place in the millimeter wavelength (mmWave) frequency band (24-300 GHz; typically the 28, 39, and/or 47 GHz bands). According to current specifications, the maximum system bandwidth for a mobile device in 5G-NR is 400 MHz, which enables a data rate throughput in the range of Gbit/s. To increase the data rate throughput even more, carrier aggregation may be used. According to current specifications of 5G-NR, carrier aggregation of two frequency ranges is possible, where each frequency range has a maximum bandwidth of 400 MHz (i.e., a total system bandwidth of 800 MHz is enabled).

While it may be feasible in frequency bands below, e.g., 6 GHz, to provide each transceiver chip with multiple transceiver chains to support carrier aggregation (e.g., one chain supporting transmission and reception in a first frequency band, such as 900 MHz, and one chain supporting transmission and reception in a second frequency band, such as 2500 MHz), one or more of the problems indicated above may become more prominent for higher frequencies (e.g., mmWave frequencies). Hence, other approaches are needed.

In the following, embodiments will be described where other approaches to multi-band operation of multi-antenna transceiver system are provided. Examples of multi-band operation include carrier aggregation scenarios and dual connectivity scenarios.

Generally, some embodiments are particularly suitable for scenarios with relatively high conversion frequency (e.g., mmW frequency), but application of the embodiments is not limited thereto.

Also generally, some embodiments are particularly suitable for massive MIMO and or precision beamforming, but application of the embodiments is not limited thereto.

Also generally, any of the multi-antenna transceiver systems, and/or transceiver chips/packages, and/or baseband processors, and/or frequency generators (reference, on-chip, or chip associated) described herein may be for (e.g., comprisable—or comprised—in) any suitable communication apparatus. Example suitable communication apparatuses include network nodes (e.g., base station, access point (AP), fixed wireless access (FWA) unit, non-terrestrial transceiver—such as satellite or unmanned aerial vehicle (UAV), etc.) and wireless communication devices (e.g., user equipment (UE), station (STA), Internet of Things (IoT) device, etc.).

Figure 2:
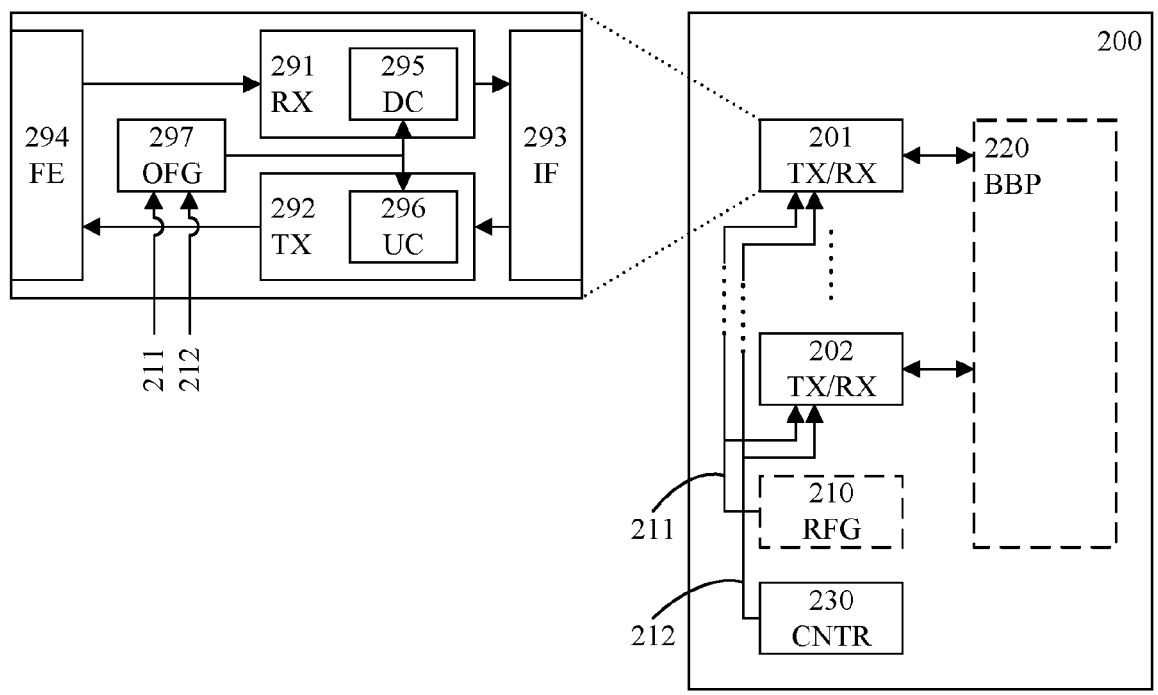
FIG. 2 is a schematic block diagram illustrating an example multi-antenna transceiver system according to some embodiments.

FIG. 2 schematically illustrates an example multi-antenna transceiver system 200 according to some embodiments. The example system 200 has a plurality (e.g., a group) of transceiver chips (TX/RX) 201, 202 and a controller (CNTR) 230. The example system 200 may also comprise a baseband processor (BBP) 220 configured to process transceiver signals for the transceiver chips. For example, the baseband circuitry may comprise one or more baseband processing chips.

Similarly to the example schematic architecture for a transceiver chip 101, 102 in FIG. 1, an example architecture for the transceiver chips 201, 202 comprises a front end (FE) 294, an interface (IF) 293, a receiver path (RX) 291 and a transmitter path (TX) 292, wherein the receiver path comprises a down-converter (DC) 295 and the transmitter path comprises an up-converter (UC) 296.

The receiver path 291 and the transmitter path 292 may generally comprise any suitable functional and/or physical components. The receiver path may, for example, comprise a low-noise amplifier (LNA), mixer circuitry (for down-conversion), one or more filters (e.g., a low-pass filter; LPF), a variable gain amplifier, and possibly an analog-to-digital converter (ADC) instance. The transmitter may, for example, comprise one or more filters (e.g., a low-pass filter; LPF), mixer circuitry (for up-conversion), a power amplifier (PA) and possibly a digital-to-analog converter (DAC) instance.

The interface 293 is for connection to the baseband processor 220, and can have any suitable functional and/or physical components.

The front-end 294 may be for connection to one or more antenna elements or may comprise one or more on-chip antenna elements. Thus, each transceiver chip 201, 202 of the multi-antenna transceiver system 200 is associated with one or more corresponding antenna elements. Furthermore, the front-end 294 may comprise any suitable functional and/or physical components. For example, the front end 294 may comprise duplexer or diplexer circuitry (e.g., switching circuitry, filters, etc.) for separation of received signals from signals to be transmitted.

In contrast to the example architecture of FIG. 1, the down-converter 295 and up-converter 296 of the example transceiver chip architecture of FIG. 2 each receives a conversion frequency (for on-chip frequency conversion of a transceiver signal) from an on-chip frequency generator (OFG) 297. The on-chip frequency generator 297 is configured to provide the conversion frequency (e.g., autonomously, or based on a reference frequency 211 provided by a reference frequency generator 210).

The controller 230 is adapted to cause configuration of the on-chip frequency generators of at least one of the transceiver chips, wherein the configuration comprises dynamically setting the respective conversion frequency. Thus, the controller can set the conversion frequency dynamically for each transceiver chip. This may be achieved via a control signal 212 from the controller to the respective on-chip frequency generators.

In some embodiments, information indicating the respective conversion frequencies may be received from a scheduler, or from another communication node (e.g., from a network node when the multi-antenna system is in a mobile device). The respective conversion frequencies may, for example correspond to bandwidth parts (BWP:s) configured for a mobile device by a network node.

Typically, the conversion frequencies may be the same frequency for all of the transceiver chips, or may be the same frequency for some of the transceiver chips, or may differ between different transceiver chips. Thus, in some embodiments, the respective conversion frequencies are different for at least two of the transceiver chips. In a typical example, the transceiver chips are divided into two or more disjunct groups and the conversion frequency is the same frequency for all transceiver chips within a group, but may differ between groups (e.g., to support carrier aggregation operation and/or dual connectivity operation).

Hence, the multi-antenna transceiver system makes it possible to support Carrier Aggregation and/or Dual Connectivity (e.g., as specified by the fifth generation new radio, 5G-NR, standard), wherein the multi-antenna transceiver system simultaneously receives or transmits radio signals in a first frequency range (using one carrier frequency) and in a second frequency range (using another carrier frequency). This is achieved by allocating some transceiver chips to the first frequency range and allocating other transceiver chips to the second frequency range (and controlling the conversion frequencies accordingly). The first and second frequency ranges may be respective subsets of a common frequency range (e.g., a 28 GHz band), or may be comprised in different frequency ranges (e.g., a 28 GHz band and a 39 GHz band).

Generally, the communication in the first and second frequency ranges may use the same or different bandwidths.

It should be noted that setting the conversion frequency dynamically for each transceiver chip can include dynamically changing the conversion frequency value for a particular transceiver chip and/or dynamically changing the partition into groups (how many groups, how many transceiver chips in each group, which transceiver chips belong to which group, etc.).

When an ADC instance and a DAC instance are comprised on the transceiver chip, the controller may be further adapted to cause configuration of the on-chip ADC and/or the on-chip DAC for dynamically setting a sampling rate of the on-chip ADC and/or DAC based on a bandwidth associated with (e.g., configured for) the respective conversion frequency (e.g., the signal bandwidth). For example, a relatively large bandwidth may require relatively high sampling rate, and vice versa. Typically, the sampling rate is chosen as at least twice of the bandwidth associated with the respective conversion frequency (e.g., as at least twice of the bandwidth for the received modulated carrier signal). For communication in first and second frequency ranges respective sampling rates may be applied, each chosen as at least twice of the bandwidth for the received modulated carrier signal of the respective frequency range).

In some embodiments, the controller is further adapted to acquire—for each of two or more conversion frequencies—a reception quality parameter value per transceiver chip. Such information may be used when dynamically setting the respective conversion frequencies. For example, transceiver chips demonstrating relatively high reception quality (e.g., higher than a threshold value and/or higher than other transceiver chips) for a conversion frequency, may be selected for using that conversion frequency. Example reception quality parameters include received signal strength, received signal strength indicator (RSSI), reference signal received power (RSRP), reference signal received quality (RSRQ), signal-to-interference ratio (SIR), or any other suitable parameter.

In an example approach to dynamically changing the partition into groups, each transceiver chip performs measurements (e.g., periodically) on the applicable reception frequency bands to acquire corresponding reception quality parameter values, and a control unit (e.g., in the baseband processor) determines a partition of the transceiver chips into two based on the reception quality parameter values.

For example, each transceiver chip may be assigned to the group corresponding to the reception frequency band for which the transceiver chip measures the highest reception quality parameter value. Alternatively or additionally, each group may comprise the transceiver chips measuring the highest (among the transceiver chips) reception quality parameter value for the reception frequency band of the group. Alternatively or additionally, each group may comprise transceiver chips measuring a reception quality parameter value for the reception frequency band of the group which exceeds a reception quality threshold value. Alternatively or additionally, there may be a requirement that a group should be assigned at least a minimum number of transceiver chips.

Due to instantiation variations, the phase of the signal indicating the respective conversion frequency for each transceiver chip may differ. Thus, an unknown, chip-specific, phase $\varphi_i$ will phase shift the baseband signal $S_i(t)$ to $S_i(t)e^{j\varphi_i}$ for transceiver chip i, i=1, . . . , N, compromising the possibilities for coherent operation (e.g., coherent combining for reception).

In some embodiments, the baseband processor may be configured to estimate a first respective phase shift of each respective transceiver chip and compensate the transceiver signals based on the first respective phase shifts. The first respective phase shift for a chip-associated frequency generator may be determined in any suitable way, e.g., by correlation of a received signal with known signal content.

Alternatively or additionally, the phase of the baseband signal for each transceiver chip may be affected differently due to the physical placement of the different transceiver chips/packages (e.g., causing different length of wiring between the reference frequency generator and the transceiver chips/packages and/or different physical positions of the antenna elements causing constructive or destructive combining). For example, such phase differences may be associated with the relative mounting positions of the transceiver chips/packages within a multi-antenna transceiver system.

To mitigate any disadvantageous effect thereof, the baseband processor may be configured to acquire a second respective phase shift of each respective transceiver chip and compensate the transceiver signals based on the second respective phase shifts. For example, the second respective phase shift of each respective chip-associated frequency generator may be precomputed based on the relative physical positions of the transceiver chips and stored in a database or memory—e.g., in the form of a look-up table, LuT, providing a mapping between transceiver chip/packet and second respective phase shift—comprised in (or otherwise associated with) the baseband processor.

Generally, the compensation of (first and/or second) phase shifts is preferably made for each transceiver chip signal separately; before combining for signal reception, and before provision to the transceiver chips for signal transmission.

Alternatively or additionally, there may be minor frequency differences between the respective conversion frequency provided for each transceiver chip due to instantiation variations and/or between the respective conversion frequency(-ies) and the carrier frequency of the received radio signal.

To mitigate any disadvantageous effect thereof, the baseband processor may be configured to estimate a frequency error for the chip-associated frequency generators and control the reference frequency generator based on the frequency error (e.g., by mapping the frequency error, via a look-up table for instance, to an electrical signal that can be fed to the reference frequency generator to update the reference frequency). The individual frequency error for a chip-associated frequency generator may be determined in any suitable way, e.g., by correlation of a received signal with known signal content. Typically, a common (e.g., combined) frequency error value may be determined for all chip-associated frequency generators of a group (e.g., an average value of the individual frequency errors for each chip-associated frequency generator, or a selected one of the individual frequency errors), and the reference frequency generator may be controlled to eliminate the common frequency error value going forward.

Returning to FIG. 2, when a reference frequency 211 is used the reference frequency generator 210 is (similarly to the frequency generator 110 of FIG. 1) configured to provide a signal indicative of a frequency to each of the transceiver chips.

However, in contrast to the system 100 of FIG. 1, the frequency provided by the reference frequency generator 210 in the example system 200 is a reference frequency 211, which is lower than the conversion frequency to be used for on-chip conversion in each of the transceiver chips (compare with 111 of FIG. 1).

Thus, the conversion frequency is typically higher than the reference frequency. Typically, the conversion frequency may be substantially higher than the reference frequency. For example, the conversion frequency may be higher than 24 GHz and/or the reference frequency may be lower than 1 GHz.

The reference frequency generator 210 may be implemented in any suitable way. For example, the reference frequency generator 210 may be a crystal oscillator (XO) and/or a voltage-controlled oscillator. Providing a relatively low frequency between chips typically causes less power dissipation and/or interference than providing a relatively high frequency between chips.

In the example of FIG. 2, the frequency generator configured to provide the conversion frequency is an on-chip frequency generator (i.e., implemented on the transceiver chip; which may be an integrated circuit—IC—chip, for example).

In other embodiments, the frequency generator configured to provide the conversion frequency may be implemented separately from (e.g., on a separate chip), but associated with, the transceiver chip; and—when applicable—the reference frequency may be provided to the frequency generator (i.e., for the transceiver chip).

For example, a chip-associated frequency generator may be implemented on a separate chip included in the same package (e.g., an encapsulation) as the transceiver chip. One example of an implementation where a chip-associated frequency generator is implemented on a separate chip included in the same package as the transceiver chip is termed system in package (SIP).

Alternatively or additionally, a chip-associated frequency generator may be implemented on a separate chip with shorter and/or more efficient wiring to the transceiver chip (e.g., in package wiring) than the reference frequency generator would have.

In some embodiments, a chip-associated frequency generator may be shared by two or more—but not all—transceiver chips.

In some embodiments, the separate chip may implement other (e.g., digital) functionality in addition to the chip-associated frequency generation.

Both implementation possibilities—on-chip frequency generator and separate frequency generator—are included when referring to a chip-associated frequency generator.

Generally, the chip-associated frequency generator may be implemented using any suitable approach capable of generating an output frequency based on an input frequency. For example, the chip-associated frequency generator may be implemented using a phase-locked loop (PLL).

In the example of FIG. 2, the reference frequency is provided directly to each transceiver chip 201, 202 (corresponding to the reference frequency being provided directly to each chip-associated frequency generator in the general case). Thus, the reference frequency 211 is provided in a parallel manner to the transceiver chips.

In an alternative solution, the reference frequency is provided directly to one, first, transceiver chip (or—generally—to one, first, chip-associated frequency generator) and to other transceiver chips (or—generally—to other chip-associated frequency generators) via the first transceiver chip (or—generally—via the first chip-associated frequency generator.

Thus, in contrast to the system 200 of FIG. 2, the reference frequency is not provided directly to each transceiver chip in the alternative solution. Instead, the reference frequency is provided directly only to a first transceiver chip, and via the first transceiver chip to the other transceiver chips.

In a typical example, the reference frequency is successively provided; from the first transceiver chip to a second transceiver chip, from the second transceiver chip to a third transceiver chip, and so on until the last transceiver chip (i.e., the reference frequency is provided in a serial manner to the transceiver chips). However, other provision patterns are also possible (e.g., the reference frequency being provided from the first transceiver chip to more than one second transceiver chip).

In contrast to the example architecture of FIG. 2, at least one (e.g., the first) transceiver chip (typically all transceiver chips) of the alternative solution comprises a reference frequency output (in addition to a reference frequency input) for providing the reference frequency to one or more further (e.g., second) transceiver chips. In some embodiments, a signal at the reference frequency input is relayed and provided at the reference frequency output.

Put more generally, a package comprising a transceiver chip and a chip-associated frequency generator comprises a reference frequency input and a reference frequency output, the latter for providing the reference frequency to one or more further transceiver chip packages. Thus, wiring from the reference frequency input to the reference frequency output need not necessarily be on the transceiver chip itself.

An advantage with these embodiments is that the reference frequency signal routing effort (e.g., wiring length) on the PCB may be reduced, and/or that the risk of PCB leakage of the reference frequency signal may be reduced, and thereby less power loss and/or interference may be experienced.

In the example of FIG. 2, the plurality of transceiver chips are not fixedly arranged in groups, and a single reference frequency generator provides the reference frequency for all of the transceiver chips.

An alternative may be envisioned where the plurality of transceiver chips are fixedly arranged in two or more groups and where each of two or more respective reference frequency generators (i.e., one reference frequency generator per group) provides the reference frequency for all of the transceiver chips in a corresponding fixed group. Generally, the reference frequencies may be the same for all such fixed groups, or may differ between at least two (e.g., some or all) of the fixed groups. These fixed groups are typically disjunct (i.e., no transceiver chip is comprised in more than one group), and may—or may not—coincide with the two or more disjunct groups for which the conversion frequency is the same frequency for all transceiver chips within a group, but may differ between groups.

By having the plurality of transceiver chips fixedly arranged in two or more groups, the wiring for provisioning of the reference frequency (e.g., total length of wiring and/or maximum wiring length from reference frequency generator to transceiver chip) may be reduced. Furthermore, the flexibility is increased. For example, such systems may be used for operation in multi-band scenarios (e.g., carrier aggregation and/or dual connectivity) by controlling the reference frequency generators and/or the chip-associated frequency generators (varying the reference frequency between fixed groups and/or varying the conversion frequency between and/or within fixed groups).

As illustrated in FIG. 2, the controller may comprise a single piece of circuitry 230 separate from the transceiver chips 201, 201 (e.g., comprised in the baseband processor or in a separate control unit). Then, the single piece of circuitry is typically adapted to cause configuration of the respective chip-associated frequency generator of two or more (typically all) of the transceiver chips.

Figure 3:
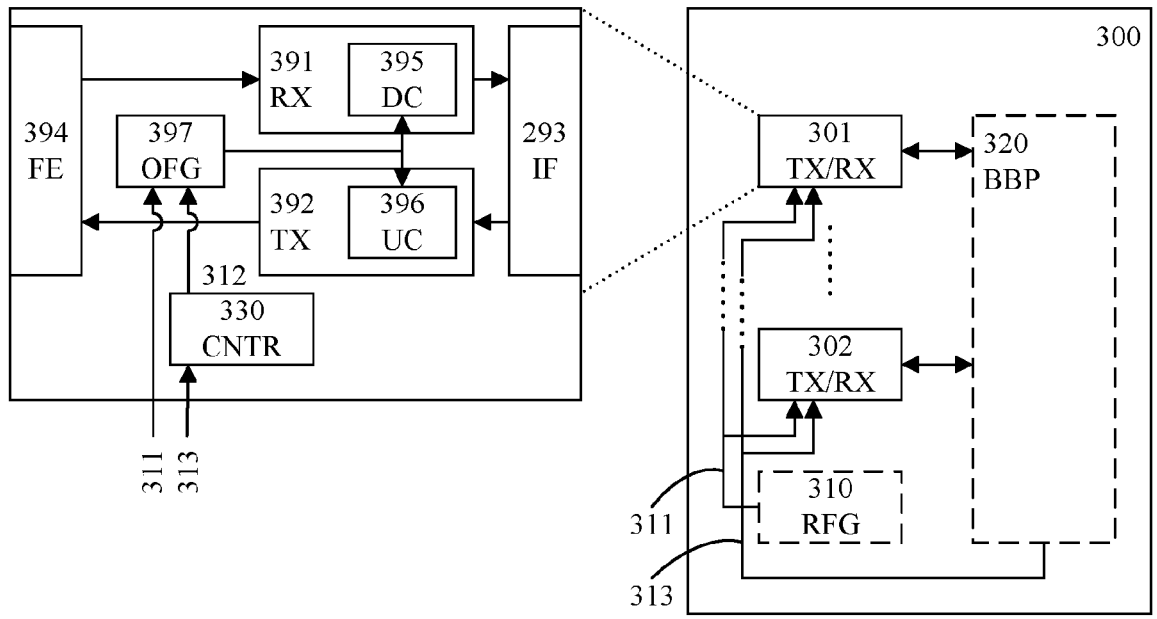
FIG. 3 is a schematic block diagram illustrating an example multi-antenna transceiver system according to some embodiments.

An alternative is illustrated in FIG. 3, where the controller (CNTR) comprises at least one respective piece of circuitry 330 comprised on at least one of the transceiver chips. The respective piece of circuitry 330 is adapted to cause configuration of the respective chip-associated frequency generator of at least the transceiver chip on which it is comprised.

In a typical example, each of the transceiver chips comprises a respective piece of circuitry 330 adapted to cause configuration (only) of the respective chip-associated frequency generator of the transceiver chip on which it is comprised. However, other variations may be equally possible (e.g., only one/some of the transceiver chips comprising a respective piece of circuitry 330 and/or a respective piece of circuitry 330 adapted to cause configuration of the respective chip-associated frequency generator of one or more transceiver chips on which it is not comprised).

In the example of FIG. 3, the respective piece of circuitry 330 is an on-chip piece of circuitry (i.e., implemented on the transceiver chip). However, it should be noted that—generally—the respective piece of circuitry may be implemented separately from (e.g., on a separate chip), but associated with, the transceiver chip (compare with the corresponding elaboration above for chip-associated frequency generator). For example, the respective piece of circuitry may be comprised in a same package/encapsulation as the transceiver chip.

Thus, FIG. 3 schematically illustrates an example multi-antenna transceiver system 300 according to some embodiments. The example system 300 has a plurality (e.g., a group) of transceiver chips (TX/RX) 301, 302; each with an on-chip (or, more generally, chip-associated) controller (CNTR) 330. The example system 300 may also comprise a baseband processor (BBP) 320 configured to process transceiver signals for the transceiver chips. Any aspects of the baseband processor 220 described in connection to FIG. 2 may be applicable also for the baseband processor 320.

Similarly to the example schematic architecture for a transceiver chip 201, 202 in FIG. 2, an example architecture for the transceiver chips 301, 302 comprises a front end (FE) 394, an interface (IF) 393, a receiver path (RX) 391 and a transmitter path (TX) 392, wherein the receiver path comprises a down-converter (DC) 395 and the transmitter path comprises an up-converter (UC) 396. Any aspects of the example schematic architecture described in connection to FIG. 2 may be applicable also for the example schematic architecture of FIG. 3.

Similarly to the example schematic architecture for a transceiver chip 201, 202 in FIG. 2, the down-converter 395 and up-converter 396 of the example transceiver chip architecture of FIG. 3 each receives a conversion frequency (for on-chip frequency conversion of a transceiver signal) from an on-chip frequency generator (OFG) 397. The on-chip frequency generator 397 is configured to provide the conversion frequency (e.g., autonomously, or based on a reference frequency 311 provided by a reference frequency generator 310).

The chip-associated controller 330 is adapted to cause configuration of the on-chip frequency generator of at least the transceiver chip on which it is comprised, wherein the configuration comprises dynamically setting the respective conversion frequency. Thus, the controller can set the conversion frequency dynamically for the associated transceiver chip. This may be achieved via a control signal 312 from the controller 330 to the on-chip frequency generator 397. In some embodiments, the baseband processor may, in turn, configure the controller 330 as illustrated by 313.

It should be noted that any features described in connection to FIG. 2 may be applicable also for the multi-antenna system of FIG. 3, as suitable.

Figure 4:
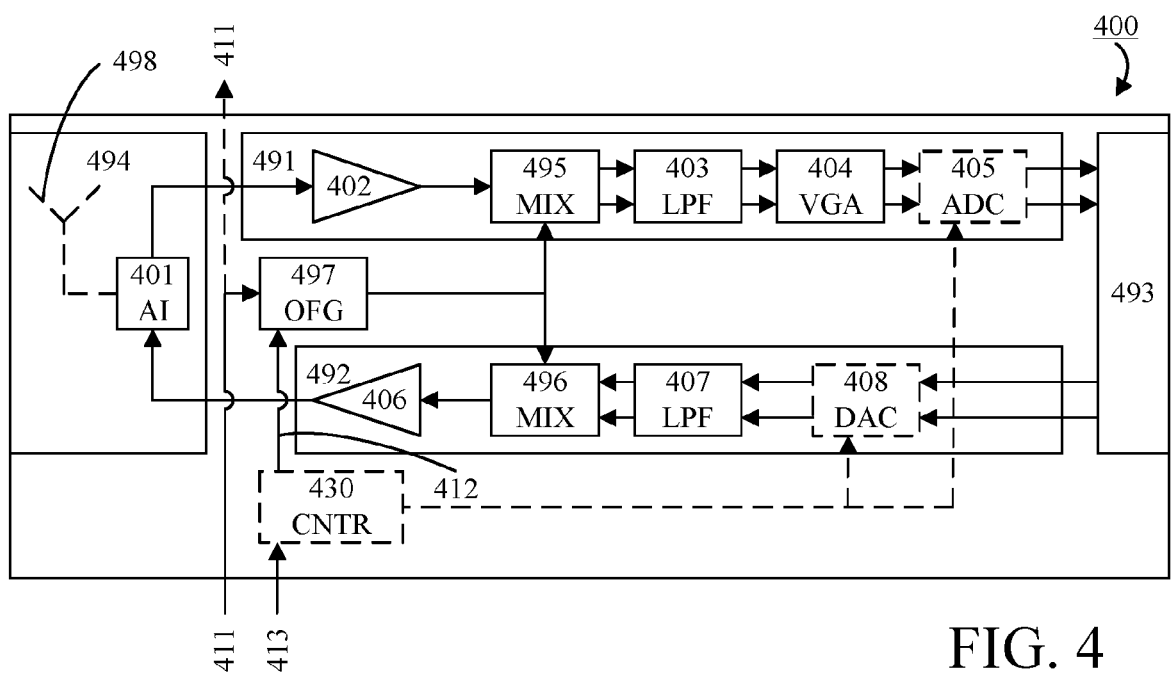
FIG. 4 is a schematic block diagram illustrating an example transceiver chip for a multi-antenna transceiver system according to some embodiments.

FIG. 4 schematically illustrates an example transceiver chip 400 for a multi-antenna transceiver system according to some embodiments. For example, the transceiver chip 400 may be used as any of the transceiver chips of FIG. 2-3.

The transceiver chip 400 comprises a front end 494, an interface 493, a receiver path 491 and a transmitter path 492.

The receiver path 491 comprises a low-noise amplifier 402, a down-converter in the form of a mixer (MIX) 495, a low-pass filter (LPF) 403, a variable gain amplifier (VGA) 404, and possibly an analog-to-digital converter (ADC) instance 405.

The transmitter path 492 comprises a low-pass filter (LPF) 407, an up-converter in the form of a mixer (MIX) 496, a power amplifier 406, and possibly a digital-to-analog converter (DAC) instance 408.

The interface 493 is for connection to baseband processing circuitry, and can have any suitable functional and/or physical components. The interface 493 is a digital interface when an ADC instance 405 and a DAC instance 408 are comprised on the transceiver chip, and the interface 493 is an analog interface when the transceiver chip does not comprise any ADC or DAC (ADC/DAC may be implemented in separate circuitry or in the baseband processing circuitry).

As illustrated by the dashed schematic antenna element 498 in FIG. 4, the front-end 494 may be for connection to one or more antenna elements (e.g., via an antenna port of the transceiver chip) or may comprise one or more on-chip (integrated) antenna elements. Thus, the transceiver chip 400 is associated with one or more corresponding antenna elements. The antenna element may, for example, comprise a broadband antenna tuned to transmit and receive signals in an applicable collection of frequency ranges.

Furthermore, the front-end 494 may comprise any suitable functional and/or physical components. For example, the front end 494 may comprise an antenna isolator (AI; e.g., duplexer or diplexer circuitry, antenna switch circuitry, or any suitable combination thereof) 401, for separation of received signals from signals to be transmitted. The antenna isolation arrangement may, for example, comprise an isolation device adapted to isolate transmitter and receiver for each other in an applicable collection of frequency ranges.

Generally, a duplexer or diplexer may be implemented with Surface-Acoustic Wave (SAW) technology, Bulk-Acoustic Wave (BAW) technology, with waveguide technology, with lumped RLC elements (on-chip and/or discrete components), and/or with transmission-lines.

The down-converter mixer 495 and up-converter mixer 496 of the transceiver chip 400 each receives a conversion frequency (for on-chip frequency conversion of a transceiver signal) from an on-chip (or otherwise chip-associated) frequency generator (OFG) 497.

As explained above, the on-chip frequency generator 497 is configured to provide the conversion frequency based on a control signal 412 indicative of a dynamic setting for the conversion frequency and possibly based on a reference frequency 411 provided to the transceiver chip 400. Put more generally, the chip-associated frequency generator is configured to provide the conversion frequency based on the control signal 412 and possibly based on a reference frequency provided to the chip-associated frequency generator for the transceiver chip.

The control signal 412 may be provided by a controller external to the transceiver chip (e.g., a common controller for all of the transceiver chips; compare with FIG. 2) or by an on-chip, or chip-associated, controller (CNTR) 430 (e.g., a controller for only that transceiver chip; compare with FIG. 3). A chip-associated controller 430 may, in turn, be instructed (e.g., by a baseband processor) via an input signal 413.

When an ADC instance 405 and a DAC instance 408 are comprised on the transceiver chip, the controller (whether chip-associated or not) may be further adapted to cause configuration of the on-chip ADC and/or the on-chip DAC for dynamically setting a sampling rate of the on-chip ADC and/or DAC based on a bandwidth associated with the respective conversion frequency (e.g., the signal bandwidth). For example, a relatively large bandwidth may require relatively high sampling rate, and vice versa.

The transceiver chip 400 may comprise a reference frequency output (in addition to a reference frequency input) for providing the reference frequency 411 to one or more further transceiver chips. Put more generally, a package comprising a transceiver chip and a chip-associated frequency generator may comprise a reference frequency input and a reference frequency output, the latter for providing the reference frequency to one or more further transceiver chip packages.

Figure 5:
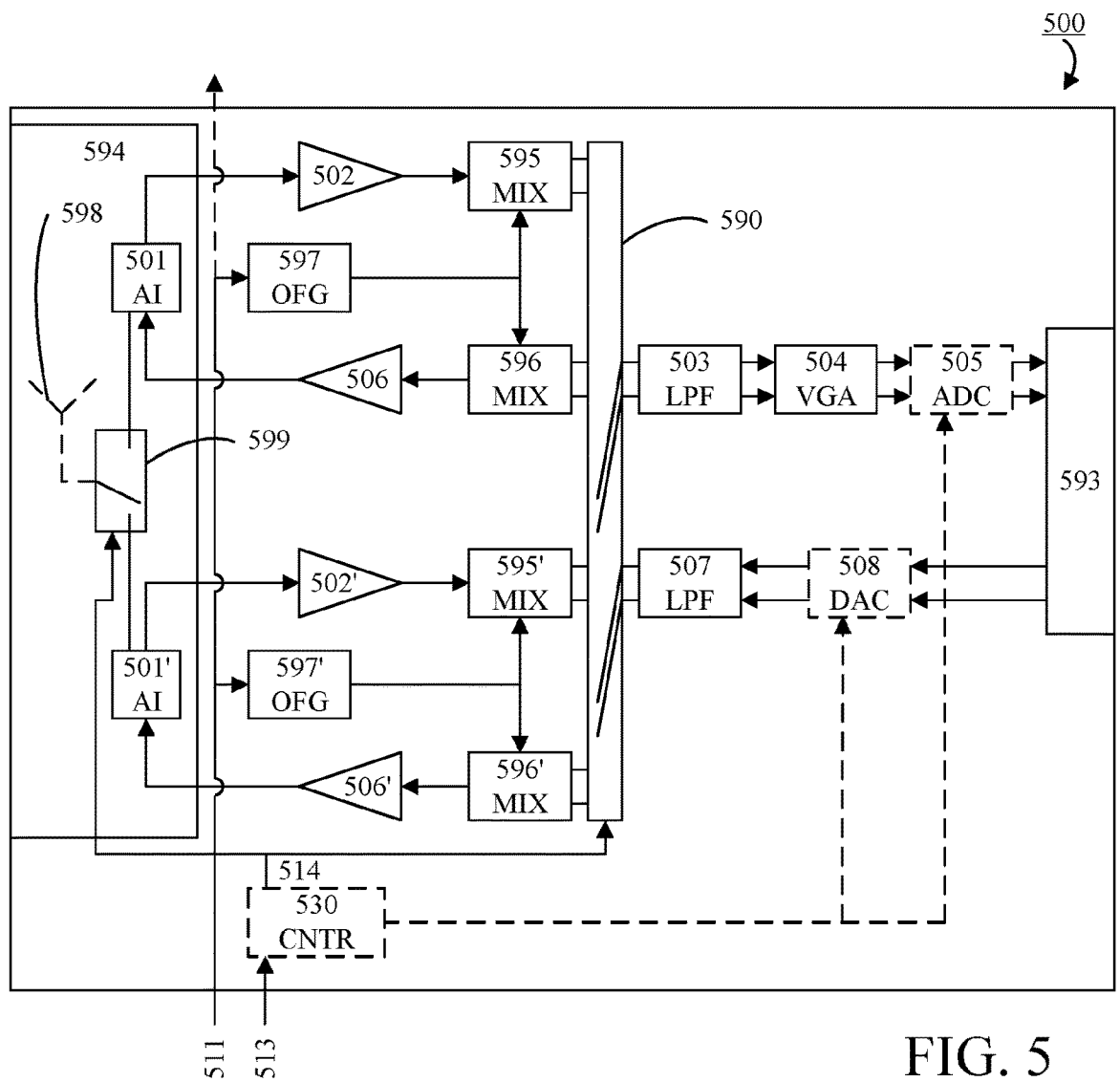
FIG. 5 is a schematic block diagram illustrating an example transceiver chip for a multi-antenna transceiver system according to some embodiments.

FIG. 5 schematically illustrates an example transceiver chip 500 for a multi-antenna transceiver system according to some embodiments. For example, the transceiver chip 500 may be used as any of the transceiver chips of FIG. 2-3. Any aspects of the transceiver chip 400 described in connection to FIG. 4 may be applicable also for the transceiver chip 500.

The transceiver chip 500 comprises a front end 594, an interface 593, receiver path and transmitter path.

The interface 593 is for connection to baseband processing circuitry, and can have any suitable functional and/or physical components.

As illustrated by the dashed schematic antenna element 598 in FIG. 5, the front-end 594 may be for connection to one or more antenna elements (e.g., via an antenna port of the transceiver chip) or may comprise one or more on-chip antenna elements. Thus, the transceiver chip 500 is associated with one or more corresponding antenna elements. Furthermore, the front-end 594 may comprise any suitable functional and/or physical components.

In contrast to the transceiver chip 400 of FIG. 4, the transceiver chip 500 has some parts of its transmitter and receiver paths duplicated (wherein the duplication is for tuning components to a particular frequency range).

Correspondingly, the front-end 594 may comprise an antenna isolator (AI; e.g., duplexer or diplexer circuitry, antenna switch circuitry, or any suitable combination thereof) 599 for selecting which of the duplication to use, and respective antenna isolators (AI) 501, 501' for separation (in relation to each of the duplication) of received signals from signals to be transmitted. For example, the front end 594 may comprise a duplexer or diplexer for selecting which of the duplication to use (i.e., providing isolation between frequencies), and antenna switches for separation of received signals from signals to be transmitted.

The receiver path comprises duplicated low-noise amplifiers 502, 502', duplicated down-converters in the form of mixers (MIX) 595, 595', a low-pass filter (LPF) 503, a variable gain amplifier (VGA) 504, and possibly an analog-to-digital converter (ADC) instance 505.

The transmitter path comprises a low-pass filter (LPF) 507, duplicated up-converters in the form of mixers (MIX) 596, 596', duplicated power amplifiers 506, 506', and possibly a digital-to-analog converter (DAC) instance 508.

Switching circuitry 590 is provided for selecting which of the mixer duplications should be connected to the low-pass filters.

The switching circuitries 590 and 599 may be controlled based on a control signal 514 indicating which of the duplications should be used.

The down-converter mixers 595, 595' and up-converter mixers 596, 596' of the transceiver chip 500 each receives a conversion frequency (for on-chip frequency conversion of a transceiver signal) from an on-chip (or otherwise chip-associated) frequency generator (OFG) 597, 597'. The chip-associated frequency generator 597, 597' may be duplicated, as illustrated in FIG. 5, or may consist of a single chip-associated frequency generator.

When duplicated, the on-chip frequency generators 597, 597' are configured to provide a respective conversion frequency; possibly based on a reference frequency 511 provided to the transceiver chip 500. For example, the relation between the reference frequency 511 and the conversion frequency may be different for the duplicated on-chip frequency generators 597, 597'. If such a relation is fixed, the dynamic setting for the conversion frequency comprises selecting which duplication to use (e.g., based on the control signal 514 from a controller). If such a relation is not fixed, the dynamic setting for the conversion frequency may comprise selecting which duplication to use as well as controlling the applicable on-chip frequency generator 597, 597' (e.g., based on a—same or different—control signal from the controller; compare with 412 of FIG. 4).

With a single chip-associated frequency generator, the on-chip frequency generator may be configured to provide the conversion frequency based on a control signal indicative of a dynamic setting for the conversion frequency; and possibly based on a reference frequency provided to the transceiver chip.

The controller may be external to the transceiver chip (e.g., a common controller for all of the transceiver chips; compare with FIG. 2) or may be an on-chip, or chip-associated, controller (CNTR) 530 (e.g., a controller for only that transceiver chip; compare with FIG. 3). A chip-associated controller 530 may, in turn, be instructed (e.g., by a baseband processor) via an input signal 513.

When an ADC instance 505 and a DAC instance 508 are comprised on the transceiver chip, the controller (whether chip-associated or not) may be further adapted to cause configuration of the on-chip ADC and/or the on-chip DAC for dynamically setting a sampling rate of the on-chip ADC and/or DAC based on a bandwidth associated with the respective conversion frequency (e.g., the signal bandwidth).

The transceiver chip 500 may comprise a reference frequency output (in addition to a reference frequency input) for providing the reference frequency 511 to one or more further transceiver chips.

To conclude, the transceiver chip 500 is an example of a transceiver chip, wherein the chip-associated frequency generator and the frequency converter comprises two sets, {595, 596, 597} and {595', 596', 597'}, each comprising a chip-associated frequency generator and at least one frequency converter; one set per conversion frequency range. In some embodiments, a transceiver chip similar to that of FIG. 5 further comprises duplication of the antenna element 598 (and the antenna isolator 599 is omitted).

In some embodiments, a transceiver chip similar to that of FIG. 4 or 5 may be provided with an extra copy of at least some of the components, such that each copy may serve a different polarization orientation of the antenna element. For example, all components may be copied except the chip-associated controller, which serves both polarization orientations.

Alternatively or additionally, a transceiver chip such as that of FIG. 4 or 5 may comprise in-phase and quadrature paths for processing and signal transfer (e.g., reaching from the frequency converter to the interface 593, as illustrated by duplicated transfer arrows in FIGS. 4 and 5).

Figure 6:
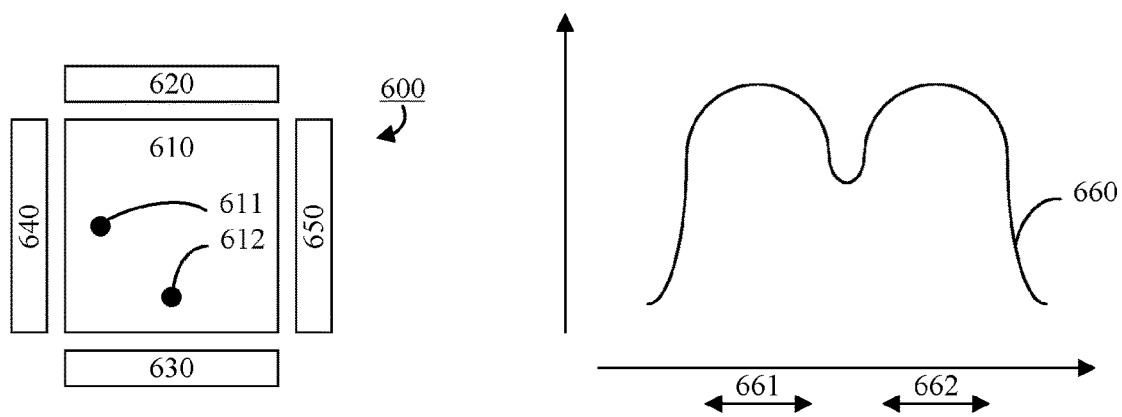
FIG. 6 is a schematic drawing illustrating example antenna specifics according to some embodiments.

FIG. 6 schematically illustrates example antenna specifics according to some embodiments. The antenna specifics of FIG. 6 may, for example, be used to implement a broadband on-chip antenna element comprised in a transceiver chip according to some embodiments, e.g., the transceiver chips described in connection with any of FIGS. 4 and 5.

As shown in FIG. 6, an example dual patch antenna 600 comprises a ground plane with a diversity patch 610 tuned for a first transmission/reception frequency (or first transmission/reception frequency range) which may be used by the transceiver chip. Typically, the ground plane with a diversity patch is tuned for the higher transmission/reception frequency (or transmission/reception frequency range) when two different conversion frequencies may be used by the transceiver chip. For example, the ground plane with a diversity patch 610 may be tuned for 39 GHz.

Antenna ports 611 and 612, enable respective polarization operation; a first polarization (e.g., horizontal) is enabled by 611 and a second polarization (e.g., vertical) is enabled by 612.

Additional patches 620, 630, 640, 650 may extend the frequency interval covered by the antenna 600, e.g., to a second transmission/reception frequency (or second transmission/reception frequency range) which may be used by the transceiver chip. Typically, the additional patches extend the frequency interval covered by the antenna to the lower transmission/reception frequency (or transmission/reception frequency range) when two different transmission/reception frequencies may be used by the transceiver chip. For example, the additional patches may extend the frequency interval covered by the antenna from 39 GHz down to 28 GHz.

In the example of FIG. 6, the additional patches 620, 630 extend the frequency interval for the first polarization and the additional patches 640, 650 extend the frequency interval for the second polarization.

A rudimental plot of antenna gain versus frequency is also presented in FIG. 6, showing an example antenna gain 660 of the dual patch antenna 600 with high antenna gain in a first frequency range 662 (e.g., comprising 39 GHz) and a second frequency range 661 (e.g., comprising 28 GHz).

Thus, the broadband antenna element 600 is a dual band patch antenna, that is designed such that two resonance peaks are achieved at respective transmission/reception frequencies. Generally, the antenna element(s) of a transceiver chip may be implemented using any suitable approach (e.g., dipole antenna(s), vertical antenna(s), patch antenna(s), or any combination thereof). In some embodiments, the antenna element(s) of a transceiver chip comprise two (or more) antenna elements; one for each frequency range.

Generally, a transmission/reception frequency may correspond to a respective conversion frequency (e.g., the respective conversion frequency may be equal to the transmission/reception frequency for conversion to baseband, and the respective conversion frequency may be lower than—but depending on—the transmission/reception frequency for conversion to intermediate frequency).

Figure 7:
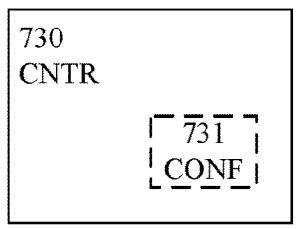
FIG. 7 is a schematic block diagram illustrating an example controller for a multi-antenna transceiver system according to some embodiments.

FIG. 7 schematically illustrates an example controller (CNTR; e.g., controlling circuitry or a control module) 730 for a multi-antenna transceiver system according to some embodiments. For example, the controller may be used to implement any of the controllers described herein, e.g., 230 of FIG. 2 or 330 of FIG. 3.

Thus, the controller 730 is for a multi-antenna transceiver system that comprises a group of transceiver chips, wherein each transceiver chip has a respective chip-associated frequency generator configured to provide a respective conversion frequency, and wherein each transceiver chip is configured to use the respective conversion frequency for on-chip frequency conversion of a transceiver signal.

The controller 730 comprises a configurer (CONF; e.g., configuring circuitry or a configuration module) 731. The configurer is adapted to cause configuration of the respective chip-associated frequency generator of at least one of the transceiver chips, wherein the configuration comprises dynamically setting the respective conversion frequency.

In some embodiments, a transceiver chip for time division duplex (TDD) operation comprises a transmitter path and a receiver path, wherein at least one of a single filter circuitry (e.g., a single quadrature filter circuitry; a pair of filters for in-phase/quadrature filtering) and a single mixer circuitry (e.g., a single quadrature mixer circuitry; a pair of mixers for in-phase/quadrature mixing) is shared by the transmitter path and the receiver path. Such a transceiver chip may, for example, be used for a multi-antenna transceiver system. Any aspects of other transceiver chip described herein (e.g., in connection with FIG. 4 or 5) may be applicable also for the transceiver chips of these embodiments.

This transceiver chip may be implemented by making the single mixer circuitry configurable (e.g., by a controller or baseband processor) in either of a reception mode and a transmission mode. In the reception mode, the mixer circuitry is configured to select a signal at a first input node for conversion, wherein the first input node is connected to the receiver path (e.g., an LNA output), and provide the mixed signal at a first output node of the mixer circuitry, wherein the first output node is connected to filter circuitry of the receiver path. In the transmission mode, the mixer circuitry is configured to select a signal at a second input node for conversion, wherein the second input node is connected to filter circuitry of the transmitter path, and provide the mixed signal at a second output node of the mixer circuitry, wherein the second output node is connected to the transmitter path (e.g., a PA input). If the filter circuitry is a single shared filter circuitry, the first output node and the second input node may coincide.

Alternatively or additionally, this transceiver chip may be implemented by making the single filter circuitry configurable in either of a reception mode and a transmission mode. In the reception mode, the filter circuitry is configured to select a signal at a first input node for filtering, wherein the first input node is connected to mixer circuitry of the receiver path, and provide the filtered signal at a first output node of the filter circuitry, wherein the first output node is connected to the receiver path (e.g., a VGA input). In the transmission mode, the filter circuitry is configured to select a signal at a second input node for filtering, wherein the second input node is connected to the transmitter path (e.g., an interface or DAC output), and provide the filtered signal at a second output node of the filter circuitry, wherein the second output node is connected to mixer circuitry of the transmitter path. If the mixer circuitry is a single shared mixer circuitry, the first input node and the second output node may coincide.

Figure 8:
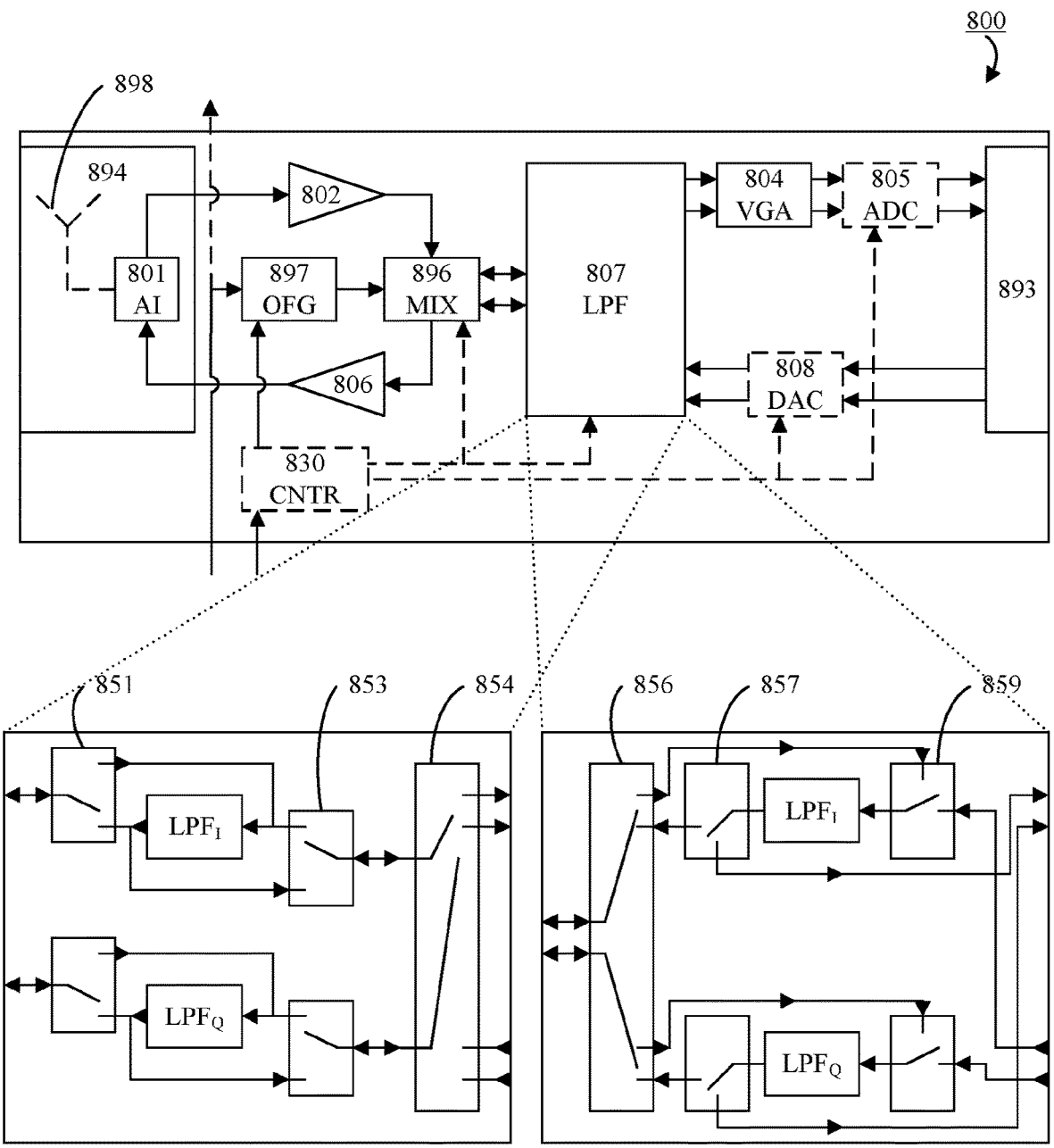
FIG. 8 is a schematic block diagram illustrating an example transceiver chip for a multi-antenna transceiver system according to some embodiments.

FIG. 8 schematically illustrates an example transceiver chip 800 for a multi-antenna transceiver system according to some embodiments, wherein a single filter circuitry and a single mixer circuitry are shared by the transmitter path and the receiver path. The transceiver chip 800 is particularly suitable for TDD operation. For example, the transceiver chip 800 may be used as any of the transceiver chips of FIG. 2-3.

The transceiver chip 800 comprises a front end 894, an interface 893, a receiver path and a transmitter path.

The receiver path comprises a low-noise amplifier 802, a down-converter in the form of a shared mixer (MIX) 896, a shared low-pass filter (LPF) 807, a variable gain amplifier (VGA) 804, and possibly an analog-to-digital converter (ADC) instance 805.

The transmitter path comprises the shared low-pass filter (LPF) 807, an up-converter in the form of the shared mixer (MIX) 896, a power amplifier 806, and possibly a digital-to-analog converter (DAC) instance 808.

The interface 893 is for connection to baseband processing circuitry, and can have any suitable functional and/or physical components.

As illustrated by the dashed schematic antenna element 898 in FIG. 8, the front-end 894 may be for connection to one or more antenna elements (e.g., via an antenna port of the transceiver chip) or may comprise one or more on-chip (integrated) antenna elements. Thus, the transceiver chip 800 is associated with one or more corresponding antenna elements.

Furthermore, the front-end 894 may comprise any suitable functional and/or physical components. For example, the front end 894 may comprise an antenna isolator (AI) 801, for separation of received signals from signals to be transmitted.

The shared mixer 896 of the transceiver chip 800 receives a conversion frequency (for on-chip frequency conversion of a transceiver signal) from an on-chip (or otherwise chip-associated) frequency generator (OFG) 897. In reception mode, the shared mixer selects a signal output from the LNA 802 for conversion and provides the result to the shared low-pass filter 807. In transmission mode, the shared mixer selects a signal from the shared low-pass filter 807 for conversion and provides the result at an input of the PA 806.

Two different implementations of the shared low-pass filter are shown (for an in-phase/quadrature filter). Only the in-phase portion will be described herein. The quadrature portion may function analogously.

In the left-hand implementation, selectors (e.g., switches) 851, 853, 854 control the filter operation to reception or transmission mode. In reception mode, the selector 851 is set (in the upper position) to guide a signal provided by the mixer circuitry to an input of the actual filter circuit $LPF_r$, and the selector 853 is set (in the lower position) to guide a signal provided at the output of the actual filter circuit $LPF_r$ to the selector 854, which is set (in the upper position) to guide the signal provided by the selector 853 to the VGA. In transmission mode, the selector 854 is set (in the lower position) to guide a signal provided by (the interface or DAC of) the transmitter path to the selector 853, which is set (in the upper position) to guide the signal provided by the selector 854 to an input of the actual filter circuit $LPF_r$, and the selector 851 is set (in the lower position) to guide a signal provided at the output of the actual filter circuit $LPF_r$ to the mixer circuitry.

In the right-hand implementation, selectors (e.g., switches) 856, 857, 859 control the filter operation to reception or transmission mode. In reception mode, the selector 856 is set (in the upper position) to guide a signal provided by the mixer circuitry to the selector 859, which is set (in the upper position) to guide the signal provided by the selector 856 to an input of the actual filter circuit $LPF_r$, and the selector 857 is set (in the lower position) to guide a signal provided at the output of the actual filter circuit $LPF_r$ to the VGA. In transmission mode, the selector 859 is set (in the lower position) to guide a signal provided by (the interface or DAC of) the transmitter path to an input of the actual filter circuit $LPF_r$, the selector 857 is set (in the upper position) to guide the signal provided at the output of the actual filter circuit $LPF_r$ to the selector 856, which is set (in the lower position) to guide the signal provided by the selector 857 to the mixer circuitry.

It should be noted that the example of FIG. 8 may be implemented with variations according to some embodiments. For example, one or more of the switches (e.g., 854, 856) may be omitted and replaced by wiring nodes. Alternatively or additionally, the LPF may comprise a single pair of in-phase/quadrature connection points for the VGA/DAC where distribution to either of the VGA or the DAC is via wiring nodes.

As explained above, the on-chip frequency generator 897 is configured to provide the conversion frequency (e.g., based on a control signal indicative of a dynamic setting for the conversion frequency and possibly based on a reference frequency provided to the transceiver chip 800). Put more generally, the chip-associated frequency generator is configured to provide the conversion frequency.

The control signal may be provided by a controller external to the transceiver chip (e.g., a common controller for all of the transceiver chips; compare with FIG. 2) or by an on-chip, or chip-associated, controller (CNTR) 830 (e.g., a controller for only that transceiver chip; compare with FIG. 3).

When an ADC instance 805 and a DAC instance 808 are comprised on the transceiver chip, the controller (whether chip-associated or not) may be further adapted to cause configuration of the on-chip ADC and/or the on-chip DAC for dynamically setting a sampling rate of the on-chip ADC and/or DAC based on a bandwidth associated with the respective conversion frequency (e.g., the signal bandwidth).

Alternatively or additionally, the controller (whether chip-associated or not) may be adapted to cause configuration of the shared mixer circuitry and the shared low-pass filter circuitry in reception or transmission mode.

Figure 9:
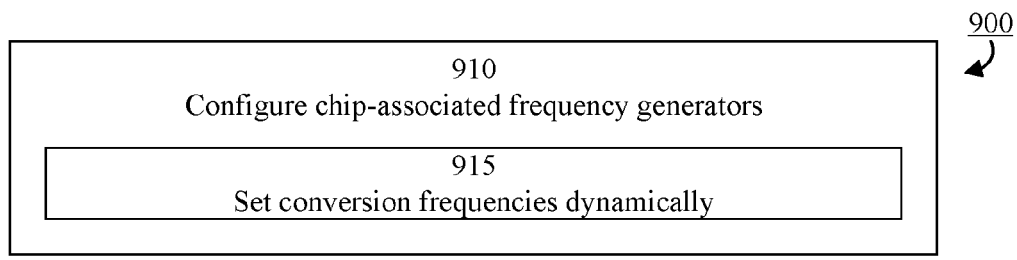
FIG. 9 is a flowchart illustrating example method steps according to some embodiments.

FIG. 9 illustrates an example method 900 according to some embodiments. The method 900 is a method of operating a multi-antenna transceiver system comprising a group of transceiver chips, wherein each transceiver chip has a respective chip-associated frequency generator configured to provide a respective conversion frequency, and wherein each transceiver chip is configured to use the respective conversion frequency for on-chip frequency conversion of a transceiver signal. For example, the method 900 may be performed by any of the controllers described herein.

As illustrated by step 910, the method comprises configuring the respective chip-associated frequency generator of at least one of the transceiver chips. The configuration comprises dynamically setting the respective conversion frequency, as illustrated by sub-step 915.

Some embodiments relate to a transceiver chip configured for transmitting and/or receiving radio signals configurable between a first frequency range and a second frequency range. The transceiver chip also comprises a control input, receiving input signals for configuring the transceiver chip for either of the first and second frequency range.

The transceiver chip may also comprise at least one an integrated antenna arrangement (tuned to tuned to the first and/or second frequency range) and one or more antenna isolation arrangements (for isolation between transmission and reception and/or between the first and second frequency range).

Typically, the transmitter path comprises a filter unit (e.g., with a filter bandwidth configured based on the first or second configured frequency range) for filtering an analog signal, a mixer unit for up-converting the analog signal to an analog radio signal with a carrier frequency determined by a local oscillator (LO), and a power amplifier (PA) connected to the antenna arrangement for amplifying the analog radio signal.

Typically, the receiver path comprises a low-noise amplifier (LNA) connected to the antenna arrangement for amplifying a received analog radio signal, a mixer unit for down-converting the received analog radio signal with a frequency determined by the LO to a received analog signal, a filter unit (e.g., with a filter bandwidth configured based on the first or second configured frequency range) for filtering the received analog signal, and a variable (or programmable) gain amplifier for amplifying the received analog signal.

The local oscillator may be connected to the mixer unit(s) and may be tuned to generate a carrier frequency inside either the first or second frequency range.

An advantage with these embodiments is that a transceiver chip is provided that enables operation in first and second frequency ranges with reduced size of the chip implementation. Designing on-chip broadband antenna arrangements supporting both frequency ranges increases flexibility for multi-antenna transceiver system design (e.g., in a printed circuit board, PCB, layout) since all transceiver chips can be (dynamically) enabled for the first or second frequency range. Hence, the transceiver chips with best radio signal strength for one of the frequency ranges can be allocated to that frequency range.

Some embodiments further relate to the transceiver chip further comprising an ADC instance in the receiver chain (for converting the received analog signal to a digital signal) and a DAC instance in the transmitter chain (for converting a digital signal to an analog signal for transmission), wherein the ADC/DAC sampling rate is adapted based on the bandwidth for the configured (first or second) frequency range.

An advantage with these embodiments is that integrating ADC/DAC in transceiver chip enables control of ADC/DAC sample rate, which can reduce the size and/or power consumption of entire multi-antenna transceiver system.

Some embodiments further relate to the broadband antenna arrangement being designed such that two resonance peaks are achieved; the first resonance peak frequency based on the first frequency range and the second resonance peak based on the second frequency range.

Some embodiments further relate to the transceiver chip further comprising two sets of PA/LNA, mixer, and LO, wherein the first set is tuned for transmission/reception in the first frequency range and the second set is tuned for transmission/reception in the second frequency range.

An advantage with these embodiments is that separate PA/LNA for the respective frequency ranges enables the PA/LNA efficiency to be optimized for the applicable frequency range, and lower power consumption may be achieved.

Some embodiments further relate to the transceiver chip further comprising a first integrated antenna arrangement with a first polarization and first transmitter and receiver paths connected to the first antenna arrangement, and a second integrated antenna arrangement with a second polarization and second transmitter and receiver paths connected to the second antenna arrangement. Typically, both antenna arrangements (and corresponding transmitter and receiver paths) may be configurable for transmission/reception in either of the first and second frequency ranges.

An advantage with these embodiments is that the number of transceiver chips of a multi-antenna transceiver system may be reduced; thereby reducing cost and/or size of the implementation.

Some embodiments further relate to the transceiver chip being designed for operation in Time Division Duplex (TDD) mode, comprising only a single mixer unit and/or only a single filter unit. The single mixer unit and/or the single filter unit being connected to the transmitter path when the transceiver chip is configured in transmitting mode and connected to the receiver path when the transceiver chip is configured in receiving mode.

An advantage with these embodiments is that the size of the transceiver chip implementation may be reduced.

Some embodiments relate to a multi-antenna transceiver arrangement (system) comprising a set of transceiver chips (e.g., as exemplified above) and a control unit (e.g., comprised in at least one of the transceiver chips or in a separate chip). The control unit is configured to control the set of transceiver chips such that a first subset of transceiver chips is configured for operation (transmission/reception of radio frequency signals) in the first frequency range and a second subset of transceiver chips is configured for operation (transmission/reception of radio frequency signals) in the second frequency range.

An advantage with these embodiments is that a simplified implementation of multi-frequency operation (e.g., intra- and/or inter-band carrier aggregation, dual connectivity, etc.) is enabled; reducing size and/or power consumption of the multi-antenna transceiver system.

Some embodiments further relate to the multi-antenna transceiver system being configured to operate in a carrier aggregation (CA) and/or dual connectivity (DC) mode according to the 5G-NR standard.

Some embodiments further relate to the multi-antenna transceiver system being configured such that the first and second frequency ranges are within a first frequency band (e.g., 28 GHz). One example is contiguous CA/DC.

Some embodiments further relate to the multi-antenna transceiver system being configured such that the first frequency range is within a first frequency band (e.g., 28 GHz) and the second frequency range is within a second frequency band (e.g., 39 GHz). One example is non-contiguous CA/DC.

Some embodiments further relate to the multi-antenna transceiver system being configured such that the first and/or second frequency range is a bandwidth part (BWP) (e.g., a subset of a frequency band, such as the 28 or 39 GHz band).

An advantage with these embodiments is that the power consumption of the multi-antenna transceiver system may be reduced.

Some embodiments further relate to the multi-antenna transceiver system operating in a beamforming MIMO system by simultaneous transmission/reception in first and second frequency ranges.

An advantage with these embodiments is that configuration of the multi-antenna transceiver system for carrier aggregation MIMO (e.g., massive MIMO) and/or beamforming increases flexibility for carrier aggregation operation in mmWave frequency bands; increasing user throughput and improving system capacity.

Some embodiments relate to a controller for a multi-antenna transceiver system, configured to configuring transceiver chips to operate in respective frequency ranges. The controller may, for example, be configured to allocate, to the respective frequency range, transceiver chip(s) based on signal strength (or another quality measure) obtained for the transceiver chip(s) in the first and second frequency ranges.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 10:
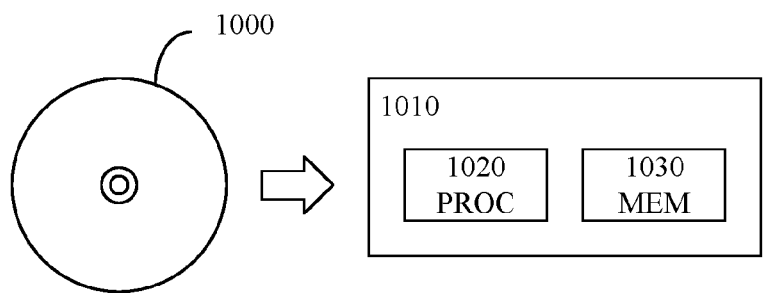
FIG. 10 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 10 illustrates an example computer readable medium in the form of a compact disc (CD) ROM 1000. The computer readable medium has stored thereon a computer program comprising program instructions. The computer program is loadable into a data processor (PROC; e.g., data processing circuitry or a data processing unit) 1020, which may, for example, be comprised in a wireless communication device or a network node 1010. When loaded into the data processor, the computer program may be stored in a memory (MEM) 1030 associated with or comprised in the data processor. According to some embodiments, the computer program may, when loaded into and run by the data processor, cause execution of method steps according to, for example, any of the methods illustrated in FIG. 9 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A multi-antenna transceiver system comprising:
a group of transceiver chips, wherein each transceiver chip has a respective chip-associated frequency generator configured to provide a respective conversion frequency, and wherein each transceiver chip is configured to use the respective conversion frequency for on-chip frequency conversion of a transceiver signal; and
a controller adapted to cause configuration of the respective chip-associated frequency generator of at least one of the transceiver chips, wherein the configuration comprises dynamically setting the respective conversion frequency, wherein the controller comprises at least one respective piece of circuitry comprised on at least one of the transceiver chips, and wherein the respective piece of circuitry is adapted to cause configuration of the respective chip-associated frequency generator of at least the transceiver chip on which it is comprised.

2. The multi-antenna transceiver system of claim 1, wherein the controller comprises a single piece of circuitry separate from the transceiver chips, and wherein the single piece of circuitry is adapted to cause configuration of the respective chip-associated frequency generator of two or more of the transceiver chips.

3. The multi-antenna transceiver system of claim 1, wherein the respective conversion frequencies are different for at least two of the transceiver chips.

4. The multi-antenna transceiver system of claim 1, wherein the controller is further adapted to acquire—for each of two or more conversion frequencies—a reception quality parameter value per transceiver chip, and wherein dynamically setting the respective conversion frequencies is based on the reception quality parameter values.

5. The multi-antenna transceiver system of claim 1, wherein the controller is further adapted to cause configuration of a respective on-chip analog-to-digital converter, ADC, and/or a respective on-chip digital-to-analog converter, DAC, of at least one of the transceiver chips, wherein the configuration comprises dynamically setting a sampling rate of the on-chip ADC and/or DAC based on a bandwidth associated with the respective conversion frequency.

6. The multi-antenna transceiver system of claim 1, further comprising baseband processing circuitry configured to process transceiver signals for the transceiver chips.

7. The multi-antenna transceiver system of claim 1, further comprising a reference frequency generator configured to provide a reference frequency for each transceiver chip of the group, wherein each respective conversion frequency is higher than the reference frequency, and wherein the respective chip-associated frequency generator of each transceiver chip is configured to provide the respective conversion frequency based on the reference frequency and on the configuration caused by the controller.

8. A controller for a multi-antenna transceiver system that comprises a group of transceiver chips, wherein each transceiver chip has a respective chip-associated frequency generator configured to provide a respective conversion frequency, and wherein each transceiver chip is configured to use the respective conversion frequency for on-chip frequency conversion of a transceiver signal, the controller comprising circuitry adapted to cause configuration of the respective chip-associated frequency generator of at least one of the transceiver chips, wherein the configuration comprises dynamically setting the respective conversion frequency, wherein the controller comprises at least one respective piece of circuitry comprised on at least one of the transceiver chips, and wherein the respective piece of circuitry is adapted to cause configuration of the respective chip-associated frequency generator of at least the transceiver chip on which it is comprised.

9. A network node comprising the multi-antenna transceiver system of claim 1.

10. A wireless communication device comprising the multi-antenna transceiver system of claim 1.

11. A method of operating a multi-antenna transceiver system comprising a group of transceiver chips, wherein each transceiver chip has a respective chip-associated frequency generator configured to provide a respective conversion frequency and a respective piece of control circuitry comprised on the transceiver chip, and wherein each transceiver chip is configured to use the respective conversion frequency for on-chip frequency conversion of a transceiver signal, the method comprising:

configuring, using the piece of control circuitry comprised on the respective transceiver chip, the respective chip-associated frequency generator of at least one of the transceiver chips on which it is comprised, wherein the configuration comprises dynamically setting the respective conversion frequency.

12. A computer program product comprising a non-transitory computer readable medium, having thereon a computer program comprising program instructions, the computer program being loadable into a data processing unit and configured to cause execution of the method according to claim 11 when the computer program is run by the data processing unit.

* * * * *